(12) United States Patent
Liao et al.

(10) Patent No.: US 10,291,143 B2
(45) Date of Patent: May 14, 2019

(54) VOLTAGE CONVERTER WITHOUT ELECTROLYTIC CAPACITOR

(71) Applicant: Guangdong BESTEK E-commerce Co., Ltd., Shenzhen (CN)

(72) Inventors: Zhigang Liao, Shenzhen (CN); Tao Hou, Shenzhen (CN)

(73) Assignee: GUANGDONG BESTEK E-COMMERCE CO., LTD., Shenzhen (CN)

( * ) Notice: Subject to any disclaimer, the term of this patent is extended or adjusted under 35 U.S.C. 154(b) by 0 days.

(21) Appl. No.: 15/571,841

(22) PCT Filed: Feb. 28, 2017

(86) PCT No.: PCT/CN2017/075080
§ 371 (c)(1),
(2) Date: Nov. 5, 2017

(87) PCT Pub. No.: WO2018/094899
PCT Pub. Date: May 31, 2018

(65) Prior Publication Data
US 2018/0351471 A1    Dec. 6, 2018

(30) Foreign Application Priority Data

Nov. 25, 2016   (CN) .......................... 2016 1 1061814

(51) Int. Cl.
*H02M 5/458*      (2006.01)
*H02M 3/158*      (2006.01)
(Continued)

(52) U.S. Cl.
CPC ......... *H02M 5/458* (2013.01); *H02M 5/4585* (2013.01); *G05F 5/00* (2013.01); *H02M 3/158* (2013.01); *H02M 5/452* (2013.01)

(58) Field of Classification Search
CPC ........ H02M 3/158; H02M 5/45; H02M 5/452; H02M 5/458; G05F 5/00
See application file for complete search history.

(56) References Cited

U.S. PATENT DOCUMENTS

| 10,038,390 | B1* | 7/2018 | Usami | G03G 15/80 |
| 2011/0032734 | A1* | 2/2011 | Melanson | H02M 1/14 363/37 |

(Continued)

FOREIGN PATENT DOCUMENTS

| CN | 102005954 A | 4/2011 |
| CN | 102255544 A | 11/2011 |

(Continued)

OTHER PUBLICATIONS

International Search Report for PCT/CN2017/075080.

*Primary Examiner* — Jue Zhang
*Assistant Examiner* — Lakaisha Jackson

(57) ABSTRACT

A long-life intelligent step-down conversion device includes a high-frequency modulation unit including a first switching tube and a second switching tube, an inductance filtering unit including a filtering inductor, and an inverting paraphase unit. The drain of the first switching tube is connected to a DC voltage, its source connects to the drain of the second switching tube, and the source of the second switching tube is carthed. The grids of the first and second switch tubes are respectively connected to two-path anti-phased PWM pulse signals. The front end of the filtering inductor is connected to the source of the first switching tube. The inverting paraphase unit, with its input terminal connected to the back end of the filtering inductor, is configured for invertedly converting a half-wave pulse voltage output from the back end of the filtering inductor to a sine AC voltage. Which of easy to carry, without electrolytic capacitors, (Continued)

improving the service life, avoiding interference to the power grid.

7 Claims, 3 Drawing Sheets

(51) Int. Cl.
    *H02M 5/452*     (2006.01)
    *G05F 5/00*     (2006.01)

(56) References Cited

U.S. PATENT DOCUMENTS

| | | | |
|---|---|---|---|
| 2012/0020118 A1* | 1/2012 | Takaki | H02M 1/32 |
| | | | 363/16 |
| 2012/0092911 A1* | 4/2012 | Usami | H02M 7/217 |
| | | | 363/89 |
| 2012/0099356 A1* | 4/2012 | Usami | H02M 7/219 |
| | | | 363/126 |
| 2017/0126134 A1* | 5/2017 | Young | H02M 1/44 |
| 2018/0269798 A1* | 9/2018 | Usami | H02M 5/458 |

FOREIGN PATENT DOCUMENTS

| | | |
|---|---|---|
| CN | 102403922 A | 4/2012 |
| CN | 106533192 A | 3/2017 |
| JP | 2011048986 A | 3/2011 |

\* cited by examiner

VOLTAGE CONVERTER WITHOUT ELECTROLYTIC CAPACITOR

BACKGROUND

1. Technical Field

The present disclosure generally relates to voltage converters field, and especially relates to a long-life intelligent step-down conversion device without electrolytic capacitors.

2. Description of Related Art

The sine wave step-down conversion device, also known as a step-down travel platooninsert, is a sine wave AC/AC converter, which the function of step-down and stable voltage and frequency can be realized in the AC/AC transformation process. At present, most AC/AC portable devices in the market output modified waves, the voltage is firstly rectified to a DC voltage by a step-down circuit, secondly filtered by an aluminum electrolytic capacitor, thirdly stepped down by the BUCK and finally inverted. However, the kind of voltage output from the step-down conversion device is mostly modified wave, which is quite harmful to electrical devices. Meanwhile, most of it is filtered with aluminum electrolytic capacitors, which seriously results in lower span-life, lower safety and lower reliability of products. At the same time, this kind of step-down conversion device has a large volume and a low PF value, which is difficult for carrying and easy to interfere with the power grid.

SUMMARY

The disclosure relates to a long-life intelligent step-down conversion device which is easy to carry without electrolytic capacitors and can improve the service life and avoid interference to the power grid.

The object of the present disclosure is to achieve by the following technical proposal:

In one aspect, a long-life intelligent step-down conversion device according to an exemplary embodiment of the present disclosure includes a high-frequency modulation unit, an inductance filtering unit, an inverting paraphase unit. The high-frequency modulation unit includes a first switching tube and a second switching tube, the drain of the first switching tube is connected to a DC voltage, the source of the first switching tube is connected to the drain of the second switching tube, and the source of the second switching tube is earthed. The grids of the first and second switching tubes are respectively connected to two-path anti-phased PWM pulse signals. The inductance filtering unit includes a filtering inductor, the front end of the filtering inductor is connected to the source of the first switching tube. When the first switching tube is on-switched and the second switching tube is off-switched, the DC voltage from the drain of the first switching tube is transmitted to the back end of the filtering inductor. When the first switching tube is off-switched and the second switching tube is on-switched, an electromotive force generated from the back end of the filtering inductor is released from the second switching tube to the front end of the filtering inductor, and the voltage of the back end of the filtering inductor is reduced to a preset value by adjusting the duty ratio of the two-path PWM pulse signals respectively loaded on the grids of the first and second switching tubes. The input terminal of the inverting paraphase unit is connected to the back end of the filtering inductor. The inverting paraphase unit is configured for invertedly converting a half-wave pulse voltage outputted from the back end of the filtering inductor to a sine AC voltage.

Wherein the long-life intelligent step-down conversion device further includes an AC input unit used to connect to a mains voltage; and a rectifying and filtering unit, with the input terminal of the rectifying and filtering unit connected to the output terminal of the AC input unit and the output terminal of the rectifying and filtering unit connected to the drain of the first switching tube, configured for rectifying and filtering the mains voltage and then forming the DC voltage to load into the drain of the first switching tube.

Wherein both the first switching tube and the second switching tube are N-channel MOS tubes.

Wherein the long-life intelligent step-down conversion device further includes an MCU controlling unit connected to all the grid of the first switching tube, the grid of the second switching tube and the control terminal of the inverting paraphase unit, the MCU controlling unit is configured for outputting the two-path anti-phased PWM pulse signals and controlling the conversion frequency of the inverting paraphase unit.

Wherein the long-life intelligent step-down conversion device further includes an AC sampling unit, with the input terminal of the AC sampling unit connected to the AC input unit and the output terminal of the AC sampling unit connected to the MCU controlling unit, the AC sampling unit is configured for collecting a voltage value and a phase of the mains voltage and then transmitting to the MCU controlling unit; and wherein the MCU controlling unit is configured for determining whether the mains voltage exceeding the preset value according to the voltage value collected by the AC sampling unit; if the preset value is exceeded, the two-path anti-phased PWM pulse signals are respectively loaded to the grid of the first switching tube and the grid of the second switching tube; if the preset value isn't exceeded, the first switching tube is maintained to on-switched situation; and controlling the conversion frequency of the inverting paraphase unit according to the phase of the mains voltage collected by the AC sampling unit in order to the inverting paraphase unit output the same sine AC voltage as the phase of the mains voltage.

Wherein the AC sampling unit includes an operational amplifier and a comparator, two input terminals of the operational amplifier are respectively connected to the live and zero lines of the AC input unit via their corresponding current-limiting resistors, and the output terminal of the operational amplifier is connected to the MCU controlling unit so that the voltage value of the mains voltage is obtained after the MCU controlling unit calculating the voltage signal output from the operational amplifier.

Wherein the output terminal of the operational amplifier is also connected to the anti-phased terminal of the comparator, the in-phased terminal of the comparator is connected to a reference voltage, the output terminal of the comparator is connected to the MCU controlling unit, and the MCU controlling unit is configured for obtaining the phase of the mains voltage according to the voltage signal output from the comparator.

Wherein the back end of the filtering inductor is connected to a voltage sampling unit with its output terminal connected to the MCU controlling unit. The voltage sampling unit is configured for collecting the DC voltage outputted from the back end of the filtering inductor and then transmitting to the MCU controlling unit.

Wherein the long-life intelligent step-down conversion device further includes a current sampling unit which includes a current transformer. The primary winding of the current transformer is connected between the front end of the filtering inductor and the source of the first switching tube, the current signal of the secondary winding of the current transformer is rectified and then transmitted to the MCU controlling unit, and the MCU controlling unit controls the first and second switching tubes cut-off when the current of the secondary winding of the current transformer exceeds the preset value.

Wherein the inverting paraphase unit includes an inverter bridge consisting of a third switching tube, a fourth switching tube, a fifth switching tube and a sixth switching tube. All the grid of the third switching tube, the grid of the fourth switching tube, the grid of the fifth switching tube and the grid of the sixth switching tube are connected to the MCU controlling unit. the MCU controlling unit is configured for controlling the third switching tube, the fourth switching tube, the fifth switching tube and the sixth switching tube on-switched or off-switched in order to the inverting paraphase unit output the sine AC voltage.

The present disclosure provides the advantages as below.

In the exemplary embodiment of the present disclosure, the drain of the first switching tube is connected to a DC voltage which can be the voltage after the mains voltage is rectified and filtered, or obtained by other means. During on work, the first switching tube and the second switching tube are alternately on-switched by the grid of the first switching tube and the grid of the second switching tube respectively connected to the two-path anti-phased PWM pulse signals. When the first switching tube is on-switched, the DC voltage is transmitted through the first switching tube and the filtering inductor in turn. When the second switching tube is on-switched, the filter inductor generates the self-inductance by the voltage mutation, which the electromotive force generated from the back end of the filtering inductor is released from the second switching tube to the front end of the filtering inductor. The output voltage of the filtering inductor is reduced by repeating the above-mentioned process. In the process above mentioned, the on-switched time of the first switching tube can be adjusted by adjusting the duty ratio of the two-path PWM pulse signals. The shorter the on-switched time of the first switching tube is, the lower the output voltage of the filtering inductor, which is realized the intelligent step-down conversion of the sine wave. Based on the above mentioned principles, the present of long-life intelligent step-down conversion device is easy to carry without electrolytic capacitors and can improve the service life and avoid interference to the power grid.

DETAILED DESCRIPTION

Figure 1:
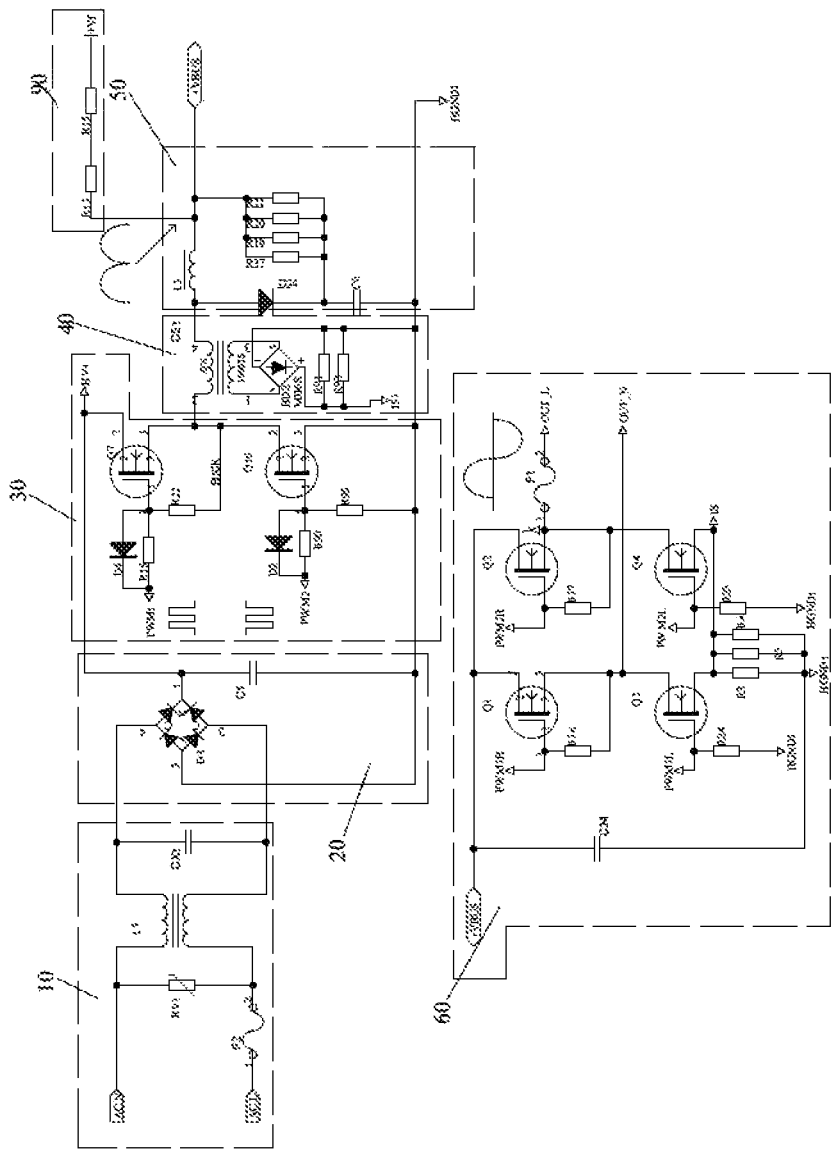
FIG. 1 is a schematic circuit diagram of the long-life intelligent step-down conversion device in accordance with an exemplary embodiment.

The disclosure is illustrated by way of example and not by way of limitation in the figures of the accompanying drawings, in which like reference numerals indicate similar elements.

Figure 2:
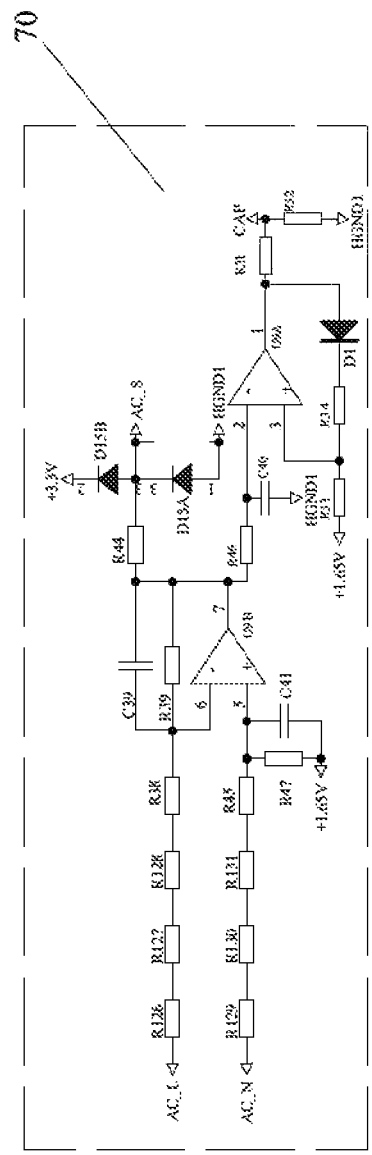
FIG. 2 is a schematic circuit diagram of an AC sampling unit of the long-life intelligent step-down conversion device of FIG. 1.
Figure 3:
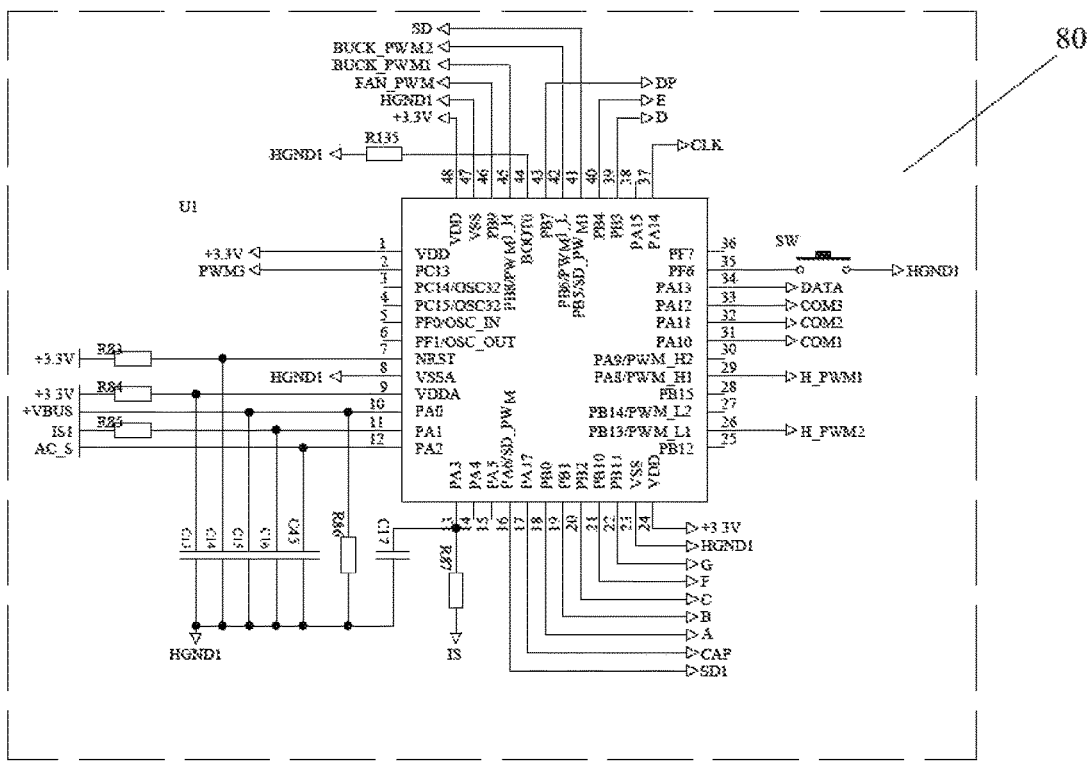
FIG. 3 is a schematic circuit diagram of an MCU controlling unit of the long-life intelligent step-down conversion device of FIG. 1.

Referring to FIGS. 1-3, a long-life intelligent step-down conversion device in accordance with an exemplary embodiment of the present disclosure includes a high-frequency modulation unit 30, an inductance filtering unit 50 and an inverting paraphase unit 60.

The high-frequency modulation unit 30 includes a first switching tube Q7 and a second switching tube Q10, the drain of the first switching tube Q7 is connected to a DC voltage, the source of the first switching tube Q7 is connected to the drain of the second switching tube Q10, and the source of the second switching tube Q10 is earthed. The grids of the first and second switching tubes Q7, Q10 are respectively connected to two-path anti-phased PWM pulse signals.

The inductance filtering unit 50 includes a filtering inductor L3. The front end of the filtering inductor L3 is connected to the source of the first switching tube Q7. When the first switching tube Q7 is on-switched and the second switching tube Q10 is off-switched, the DC voltage from the drain of the first switching tube Q7 is transmitted to the back end of the filter inductor 13. When the first switching tube Q7 is off-switched and the second switching tube Q10 is on-switched, an electromotive force generated from the back end of the filtering inductor L3 is released from the second switch tube Q10 to the front end of the filer inductor L3, and the voltage of the back end of the filter inductor L3 is reduced to a preset value by adjusting the duty ratio of the two-path PWM pulse signals respectively loaded on the grid of the first switching tube Q7 and the grid of the second switching tube Q10.

The input terminal of the inverting paraphase unit 60 is connected to the back end of the filtering inductor L3. The inverting paraphase unit 60 is configured for invertedly converting a half-wave pulse voltage outputted from the back end of the filter inductor L3 to a sine AC voltage.

The working principle of the long-life intelligent step-down conversion device above mentioned is: the drain of the first switching tube Q7 is connected to the DC voltage which can be the voltage after the mains voltage is rectified and filtered, or obtained by other means. During on work, the first switching tube Q7 and the second switching tube Q10 are alternately on-switched by the grid of the first switching tube Q7 and the grid of the second switching tube Q10 respectively connected to the two-path anti-phased PWM pulse signals. When the first switching tube Q7 is on-switched, the DC voltage is transmitted through the first switching tube Q7 and the filtering inductor L3 in turn. When the second switching tube Q10 is on-switched, the filtering inductor L3 generates the self-inductance by the voltage mutation, which the electromotive force generated from the back end of the filtering inductor L3 is released from the second switching tube Q10 to the front end of the filtering inductor L3. The output voltage of the filtering inductor L3 is reduced by repeating the above-mentioned process. In the process above mentioned, the on-switched time of the first switching tube Q7 can be adjusted by adjusting the duty ratio of the two-path PWM pulse signals. The shorter the on-switched time of the first switching tube Q7 is, the lower the output voltage of the filter inductor L3 is, which is realized the intelligent step-down conversion of the sine wave. Based on the above mentioned principles, the present long-life intelligent step-down conversion device is easy to carry without electrolytic capacitors, and can improve the service life and avoid interference to the power grid.

In the exemplary embodiment of the present disclosure, the DC voltage is preferably the voltage after the mains voltage is rectified and filtered. The long-life intelligent step-down conversion device further includes an AC input unit 10 and a rectifying and filtering unit 20. The AC input unit 10 is used to connect to the mains voltage, the input terminal of the rectifying and filtering unit 20 is connected to the output terminal of the AC input unit 10 and the output terminal of the rectifying and filtering unit 20 is connected to the drain of the first switching tube Q7. The rectifying and filtering unit 20 is configured for rectifying and filtering the mains voltage, and then forming the DC voltage to load into the drain of the first switching tube Q7.

Referring to FIG. 1, in the exemplary embodiment of the present disclosure, the input side of the high-frequency modulation unit 30 is accessed to direct current by using the rectification function of the rectifying and filtering unit 20. After the direct current is processed by the high-frequency modulation unit 30 and the inductance filtering unit 50, a half-wave pulse voltage is transmitted to the inverting paraphase unit 60. A sine alternating current is formed after the inverting paraphase unit 60 inverting only one half-wave of two adjacent half-waves. Comparing to the related art, using the electrolytic capacitor to filter into a smooth direct current, and then converting the smooth direct current as an alternating current. The present disclosure can obtain the alternating current only by the inverting phase process, which the conversion efficiency is greatly improved.

In the exemplary embodiment of the present disclosure, both the first switching tube Q7 and the second switching tube Q10 are N-channel MOS tubes.

Referring to FIGS. 1-3, In order to better realize intelligent control, the long-life intelligent step-down conversion device further includes an MCU controlling unit 80. All the grid of the first switching tube Q7, the grid of the second switching tube Q10 and the control terminal of the inverting paraphase unit 60 are connected to the MCU controlling unit 80. The MCU controlling unit 80 is configured for outputting the two-path anti-phased PWM pulse signals and controlling the conversion frequency of the inverting paraphase unit 60. Furthermore, the MCU controlling unit 80 includes a single-chip microcomputer U1 and its peripheral circuit.

In practical use, in terms of the step-down travel platoon-inserts, it is only necessary to step-down conversion when applied to the environment of higher mains voltage. Therefore, it is necessary to sample and determine the AC voltage. In order to conveniently sampling the mains voltage, the long-life intelligent step-down conversion device further includes an AC sampling unit 70. The input terminal of the AC sampling unit 70 is connected to the AC input unit 10 and the output terminal of the AC sampling unit 70 is connected to the MCU controlling unit 80. The AC sampling unit 70 is configured for collecting a voltage value and a phase of the mains voltage and then transmitting to the MCU controlling unit 80. The MCU controlling unit 80 is configured for determining whether the mains voltage exceeding a preset value according to the voltage value collected by the AC sampling unit 70. If the preset value is exceeded, the two-path anti-phased PWM pulse signals are respectively loaded to the grid of the first switching tube Q7 and the grid of the second switching tube Q10. If the preset value isn't exceeded, the first switching tube Q7 is maintained to the on-switched situation. The MCU controlling unit 80 is also configured for controlling the conversion frequency of the inverting paraphase unit 60 according to the phase of the mains voltage collected by the AC sampling unit 70 in order to the inverting paraphase unit 60 output the same sine AC voltage as the phase of the mains voltage.

With respect to the specific composition of the AC sampling unit 70, the AC sampling unit 70 includes an operational amplifier U9B and a comparator U9A, two input terminals of the operational amplifier U9B are respectively connected to the live and zero lines of the AC input unit 10 via their corresponding current-limiting resistors, and the output terminal of the operational amplifier U9B is connected to the MCU controlling unit 80 so that the voltage value of the mains voltage is obtained after the MCU controlling unit 80 calculating the voltage signal output from the operational amplifier U9B. The output terminal of the operational amplifier U9B is also connected to the anti-phased terminal of the comparator U9A, the in-phased terminal of the comparator U9A is connected to a reference voltage, and the output terminal of the comparator U9A is connected to the MCU controlling unit 80. The MCU controlling unit 80 is configured for obtaining the phase of the mains voltage according to the voltage signal output from the comparator U9A.

In the AC sampling unit 70 above mentioned, the phase sample is performed while the mains AC voltage is subjected to voltage sampling. Based on the change of the phase, the MCU controlling unit 80 can correspondingly control the conversion frequency of the inverting paraphase unit 60 so that the inverse voltage output from the inverting paraphase unit 60 is the same as that of the mains AC voltage, thereby achieving a higher PF value and reducing interference to the power grid.

In order to achieve an output sample, the back end of the filtering inductor L3 is connected to a voltage sampling unit 90 with its output terminal connected to the MCU controlling unit 80. The voltage sampling unit 90 is configured for collecting the DC voltage outputted from the back end of the filtering inductor L3 and then transmitting to the MCU controlling unit 80. It can be understood that the voltage sampling unit 90 may be composed of two or more series sampling resistors.

In order to achieve over-current protection, the long-life intelligent step-down conversion device further includes a current sampling unit 40 which includes a current transformer CS1. The primary winding of the current transformer CS1 is connected between the front end of the filter inductor L3 and the source of the first switching tube Q7. The current signal of the secondary winding of the current transformer CS1 is rectified and then transmitted to the MCU controlling unit 80. The MCU controlling unit 80 controls both the first switching tube Q7 and the second switching tube Q10 to be cut-off when the current of the secondary winding of the current transformer CS1 exceeds a preset value. The above preset values may be written in advance to the MCU controlling unit 80 for reference.

With respect to the composition of the inverting paraphase unit 60, the inverting paraphase unit 60 includes an inverter bridge consisting of a third switching tube Q1, a fourth switching tube Q2, a fifth switching tube Q3 and a sixth switching tube Q4. The grid of the third switching tube Q1, the grid of the fourth switching tube Q2, the grid of the fifth switching tube Q3 and the grid of the sixth switching tube Q4 are respectively connected to the MCU controlling unit 80. the MCU controlling unit 80 is configured for controlling the third switching tube Q1, the fourth switching tube Q2, the fifth switching tube Q3 and the sixth switching tube Q4 to be on-switched or off-switched in order to the inverting paraphase unit 60 output the sine AC voltage.

The above-described units are integrated to form a preferred embodiment of the present disclosure. The overall operation of the preferred embodiment is shown in FIGS. 1-3:

The voltage of the power grid is filtered by an AC socket, an insurance F2, a lightning protection resistor RV1, a common mode suppression filtering inductor L1 and a group filtering circuits CX1 to form an AC voltage and then given to the rectifying and filtering unit. The single-chip microcomputer U1 samples the AC input voltage by the voltage sampling circuit consisting of the resistors R126, R127, R128, R38, R129, R130, R131, R45, the capacitor C39, the resistors R39, R47, the capacitor C41, the resistor R44 and the diode D15, and samples the AC input phase by the phase sampling circuit consisting of the resistor R46, the capacitor C40, the resistors R33, R34, the diode D1 and the resistors R31, R32, which is used to determine the operation mode of the high-frequency modulation circuit. Both the diode D3 and the CBB capacitor C1 form the rectifying and filtering circuit, and the diode D3 is configured for rectifying the voltage of the power grid into two half-waves which is filtered out clutter interference by the CBB capacitor C1.

As the step-down key part, the high-frequency modulation circuit includes the first switching tube Q7 and the second switching tube Q10. When a grid voltage sampled by the AC sampling circuit is higher than AC120V voltage, the high-frequency signals PWM1, PWM2 output from the single-chip microcomputer U1 respectively passes through the driven circuit consisting of the diode D4, the resistors R18, R22, the diode D2 and the resistors R90, R95 and then respectively transmits to the gate of the first switching tube Q7 and the gate of the second switching tube Q10. The control pulse width of the first and second switching tubes Q7, Q10 is adjusted according to the sinusoidal change mode sampled by the AC sampling circuit, and the phase of the first switching tube Q7 and the second switching tube Q10 is inverted 180 degrees. When the grid voltage sampled by the AC sampling circuit is equal to or less than AC110 power grid voltage, the first switching tube Q7 is always on-switched, and the second switching tube Q10 is always off-switched, the AC half-wave voltage after being rectified and filtered directly passes through the first switching tube Q7 and then flows to the inductance filtering unit 50. The principle of specific step-down is: when the first switching tube Q7 is on-switched, the DC high voltage of the CBB capacitor C1 is transformed into a pulse level, and then the pulse level is stepped down by the filtering inductor L3 of the filtering circuit. The filtering inductor L3 forms a high impedance for the high-frequency voltage and current to step down so that the high voltage is converted to low voltage, and the low frequency and half-wave voltage is left after the high-frequency pulse signals filtered by the filtering inductor L3.

In the exemplary embodiment of the present disclosure, the high-frequency filter circuit includes the filtering inductor L3, a high-frequency voltage and current modulated by the first and second switching tubes Q7, Q10 passes through the filtering inductor L3 to filter and then become an AC half-wave voltage. If the first switching tube Q7 is on power-frequency mode, the filtering circuit does not work, which is equivalent to direct connection. The voltage filtered by the filtering inductor L3 passes through the voltage sampling circuit consisting of the resistors R13, R15 and then transmits to the single-chip microcomputer U1 so that the duty ratio of the PWM signals of the first and second switching tubes Q7, Q10 is determined by the single-chip microcomputer U1. That is to say, the high-frequency modulation circuit, the current sampling circuit, the filtering circuit and the voltage sampling circuit cooperatively form a closed loop to adjust the duty ratio of the first and second switching tubes Q7, Q10 to achieve a stable filtering output voltage.

As some extension functions, in the over-current protection circuit, die current transformer CS1, the rectifier bridge BD2 and the resistors R91, R93 are formed a current sampling circuit connected in series to the output terminals of the modulation circuit, which is configured for sampling the output current. When the rear circuit is over-current, overload or short out, the first switching tube Q7 is closed, thereby without voltage output from the rear circuit.

The inverting paraphrase circuit is consisted of the third switching tube Q1, the fourth switching tube Q2, the fifth switching tube Q3 and the sixth switching tube Q4. A first output half-wave AC voltage through the filtering inductor L3 passes through the third switching tube Q1 and the sixth switching tube Q4 and is given to the load. A second output half-wave AC voltage through the filtering inductor L3 passes through the fourth switching tube Q2 and the fifth switching tube Q3 and is given to the load. In this way, a complete frequency sine AC voltage is formed on the load. The PWM signal output from the single-chip microcomputer U1 is driven by a driving circuit and then respectively sent the PWM1H, PWM2H, PWM1L, PWM2L signals to their corresponding gate of the third, fourth, fifth and sixth switching tubes Q1, Q2, Q3, Q4, and the phase of the inverting paraphase circuit is locked according to the phase taken by the input sampling circuit. That is to say, the frequency and the phase of the inverting paraphrase circuit are consistent with the frequency and the phase of the input voltage.

The long-life intelligent step-down conversion device is disclosed with small volume, light weight and easy to carry, can automatically adjust its output voltage within the input full voltage range, and output the output voltage in a pure sinusoidal mode, which is of less damaging and strong compatibility. At the same time, the present disclosure of the long-life intelligent step-down conversion device does not use an almninum electrolytic capacitor to filter, but using a CBB capacitor with long span-life, thereby the span-life of the product is improved. In addition, the output voltage can follow the changes of the AC power grid, thereby the long-life intelligent step-down conversion device is of a high PF value and less interference to the power grid.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A voltage converter, comprising:
 a high-frequency modulation unit comprising a first switching tube and a second switching tube, the drain of the first switching tube connected to a DC voltage, the source of the first switching tube connected to the drain of the second switching tube, and the source of the second switching tube earthed, the grids of the first and second switching tubes respectively connected to two-path anti-phased PWM pulse signals;
 an inductance filtering unit comprising a filtering inductor, the front end of the filtering inductor connected to the source of the first switching tube, wherein when the first switching tube is on-switched and the second switching tube is off-switched, a DC voltage from the drain of the first switching tube is transmitted to the back end of the filter inductor; when the first switching tube is off-switched and the second switching tube is on-switched, an electromotive force generated from the back end of the filtering inductor is released from the second switch tube to the front end of the filter inductor, and the voltage of the back end of the filter inductor is reduced to a preset value by adjusting a duty ratio of the two-path PWM pulse signals respectively loaded on the grids of the first and second switching tubes; and wherein an inverting paraphrase unit, with its input terminal connected to the back end of the filtering inductor, is configured for invertedly converting a half-wave pulse voltage outputted from the back end of the filtering inductor to a sine AC voltage;

an AC input unit used to connect to a mains voltage;

a rectifying and filtering unit, with the input terminal of the rectifying and filtering unit connected to the output terminal of the AC input unit and the output terminal of the rectifying and filtering unit connected to the drain of the first switching tube, configured for rectifying and filtering the mains voltage and then forming the DC voltage to load into the drain of the first switching tube;

an MCU controlling unit connected to all the grid of the first switching tube, the grid of the second switching tube and a control terminal of the inverting paraphrase unit, and configured for outputting the two-path anti-phased PWM pulse signals and controlling a conversion frequency of the inverting paraphrase unit;

an AC sampling unit, with the input terminal of the AC sampling unit connected to the AC input unit and the output terminal of the AC sampling unit connected to the MCU controlling unit, configured for collecting a voltage value and a phase of the mains voltage and then transmitting to the MCU controlling unit; and wherein the MCU controlling unit is configured for:

determining whether the mains voltage exceeding a preset value according to the voltage value collected by the AC sampling unit; if the preset value is exceeded, the two-path anti-phased PWM pulse signals are respectively loaded to the grid of the first switching tube and the grid of the second switching tube; if the preset value isn't exceeded, the first switching tube is maintained to on-switched situation; and controlling the conversion frequency of the inverting paraphrase unit according to the phase of the mains voltage collected by the AC sampling unit in order to the inverting paraphrase unit output the same sine AC voltage as the phase of the mains voltage.

2. The voltage converter as claimed in claim 1, wherein the inverting paraphrase unit comprises an inverter bridge consisting of a third switching tube, a fourth switching tube, a fifth switching tube and a sixth switching tube, all the grid of the third switching tube, the grid of the fourth switching tube, the grid of the fifth switching tube and the grid of the sixth switching tube are connected to the MCU controlling unit, the MCU controlling unit is configured for controlling the third switching tube, the fourth switching tube, the fifth switching tube and the sixth switching tube on-switched or off-switched in order to the inverting paraphrase unit output the sine AC voltage.

3. The voltage converter as claimed in claim 1, wherein both the first switching tube and the second switching tube are N-channel MOS tubes.

4. The voltage converter as claimed in claim 1, wherein the long-life intelligent step-down conversion device further comprises a current sampling unit comprising a current transformer, the primary winding of the current transformer is connected between the front end of the filtering inductor and the source of the first switching tube, a current signal of the secondary winding of the current transformer is rectified and then transmitted to the MCU controlling unit, the MCU controlling unit controls the first and second switching tubes cut-off when the current signal of the secondary winding of the current transformer exceeds the preset value.

5. The voltage converter as claimed in claim 1, wherein the back end of the filtering inductor is connected to a voltage sampling unit, with the output terminal of the voltage sampling unit connected to the MCU controlling unit, the voltage sampling unit is configured for collecting the DC voltage outputted from the back end of the filtering inductor and then transmitting to the MCU controlling unit.

6. The voltage converter as claimed in claim 1, wherein the AC sampling unit comprises an operational amplifier and a comparator, two input terminals of the operational amplifier respectively connected to the live and zero lines of the AC input unit via their corresponding current-limiting resistors, and the output terminal of the operational amplifier connected to the MCU controlling unit so that the voltage value of the mains voltage is obtained after the MCU controlling unit calculating a voltage signal output from the operational amplifier.

7. The voltage converter as claimed in claim 6, wherein the output terminal of the operational amplifier is also connected to an anti-phased terminal of a comparator, the in-phased terminal of the comparator is connected to a reference voltage, the output terminal of the comparator is connected to the MCU controlling unit, and the MCU controlling unit is configured for obtaining the phase of the mains voltage according to the voltage signal output from the comparator.

* * * * *